(12) United States Patent
Lambert et al.

(10) Patent No.: US 7,900,211 B2
(45) Date of Patent: *Mar. 1, 2011

(54) METHOD AND APPARATUS FOR DATA TRANSFER ACROSS A NETWORK

(75) Inventors: Howard Shelton Lambert, Southampton (GB); James Ronald Lewis Orchard, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 418 days.

This patent is subject to a terminal disclaimer.

(21) Appl. No.: 12/049,761

(22) Filed: Mar. 17, 2008

(65) Prior Publication Data

US 2008/0307434 A1 Dec. 11, 2008

Related U.S. Application Data

(63) Continuation of application No. 10/198,552, filed on Jul. 18, 2002, now Pat. No. 7,350,212.

(30) Foreign Application Priority Data

Jul. 30, 2001 (GB) .................................. 0118470.4

(51) Int. Cl.
G06F 9/46 (2006.01)
G06F 9/44 (2006.01)
G06F 9/54 (2006.01)
G06F 17/30 (2006.01)
H04L 9/00 (2006.01)

(52) U.S. Cl. .................... 719/315; 719/330; 707/999.01
(58) Field of Classification Search ........................ None
See application file for complete search history.

(56) References Cited

U.S. PATENT DOCUMENTS 5,899,997 A 5/1999 Ellacott
6,453,356 B1 9/2002 Sheard et al.
6,601,234 B1 7/2003 Bowman-Amuah
6,848,108 B1 1/2005 Caron

OTHER PUBLICATIONS

"MQSeries Everyplace for Multiplatforms—Programming Guide—Version 1.2.5", 2005130 pages, IBM.
"MQSeries Everyplace for Multiplatforms—Programming Guide—", 2001, pp. 1-281, IBM.
Schmidt et al., "An Introduction to CORBA Messaging", SIGS C++ Report, Nov./Dec. 1998, pp. 3; 22-28, vol. 10 No. 10.
United States Patent and Trademark Office, Office Action for U.S. Appl. No. 10/198,552, May 18, 2006, pp. 1-15, Alexandria, VA, USA.
United States Patent and Trademark Office, Office Action for U.S. Appl. No. 10/198,552, Nov. 1, 2006, pp. 1-20, Alexandria, VA, USA.
United States Patent and Trademark Office, Office Action for U.S. Appl. No. 10/198,552, Jul. 6, 2007, pp. 1-22, Alexandria, VA, USA.

*Primary Examiner* — Li B Zhen
(74) *Attorney, Agent, or Firm* — Lee Law, PLLC; Christopher B. Lee

(57) ABSTRACT

Provided are methods, computer programs and apparatus for communication in a distributed object-oriented data processing environment. Requests for retrieval of data items from another data processing apparatus include embedded objects having executable class functions for performing operations at the target data processing apparatus. This has the advantages of the request implicitly sending data as well as requesting data and allows the request to perform a test on data within an object. Objects within the request can be embedded within each other with different encryption and compression applied to the different objects. As well as achieving communication efficiencies, the ability to selectively encrypt components of a request can be used to provide greater security. For example a store may be able to interpret the request, but credit details may be separately encrypted such that only a bank can decrypt that subcomponent of the request.

1 Claim, 2 Drawing Sheets

US 7,900,211 B2

METHOD AND APPARATUS FOR DATA TRANSFER ACROSS A NETWORK

RELATED APPLICATIONS

This application is a continuation of and claims priority to and claims the benefit of U.S. patent application Ser. No. 10/198,552, titled "METHOD AND APPARATUS FOR DATA TRANSFER ACROSS A NETWORK," which was filed in the U.S. Patent and Trademark Office on Jul. 18, 2002, now issued as U.S. Pat. No. 7,350,212, and which is incorporated herein by reference in its entirety; and this application is related to U.S. patent application Ser. No. 12/052,258, titled "METHOD AND APPARATUS FOR DATA TRANSFER ACROSS A NETWORK," filed on Mar. 20, 2008, which is also incorporated herein by reference in its entirety.

This application is a continuation of application Ser. No. 10/198,552, filed Jul. 18, 2002, status allowed.

FIELD OF INVENTION

The present invention relates to methods and apparatus for efficient data transfer via a communications network.

BACKGROUND

Many communications solutions implement a synchronous communication model—requiring a dedicated logical connection between sender and receiver for the communication to succeed. For example, Web browser HTTP requests and responses are synchronous—the requesting Web browser typically sends a request and waits for a response from the Web server before continuing with any other processing. The initial HTTP request includes a Uniform Resource Locator (URL) specifying the Web page that the user of the Web browser requires. An Internet user may initiate a conversational flow of requests and responses, such as when enquiring about and then ordering a product, and it may be necessary for one or more of the flows to be encrypted to protect the user's credit card details or other personal information. The conventional approach to providing such security uses Secure Sockets Layers (SSL) which provides all-or-nothing encryption across a communication link but does not provide end-to-end security between application programs.

Asynchronous communication models are also well known, such as implemented by a number of commercially available message-oriented middleware products. Middleware products support communications between application programs across a network. These include IBM Corporation's MQSeries and WebSphere MQ family of messaging products, which use asynchronous messaging via queues. A sender application program issues a PutMessage command to send a message to a target queue, and MQSeries queue manager programs handle the complexities of transferring the message from the sender to the target queue, which may be remotely located across a heterogeneous computer network. The MQSeries queue manager programs implement transactional assured message delivery even when the destination application is not available at the time the message was sent. The target queue is a local input queue for another application program, which retrieves the message from its input queue by issuing a GetMessage command asynchronously from the send operation. The receiver application program then performs its processing on the message, and may generate further messages.

IBM Corporation's MQSeries Everyplace product is an example of a messaging product which implements asynchronous communications as described above as well as a form of synchronous communication. That is, a local MQSeries Everyplace queue manager can (1) Put a message to a local queue and then return control to the sending application (the local queue may be a proxy for a remote queue, with asynchronous message transfer between the local proxy and the remote destination queue being trusted to the queue manager programs), or (2) it can implement a PutMessage operation to place the message on a remote queue and only return control when the message is confirmed to have arrived at the target queue. In both cases, a PutMessage operation is followed by a subsequent GetMessage operation to take the message from the target queue, and so the overall application-to-application communication is asynchronous. IBM's MQSeries Everyplace product has been developed using object-oriented (OO) programming techniques. (IBM, WebSphere, MQSeries and Everyplace are trademarks of International Business Machines Corporation).

As is well known in OO programming, objects are instances of classes which are abstract definitions of the characteristic attributes and functions (known as methods) of a named data type which represents a real world entity. Thus each class is an abstraction of a real world entity. An object includes attribute data and the class functions (methods) which operate on that data. The data and class functions are tightly bound together within the object, and this integration of data and class functions within an object is known as encapsulation. Another important concept of OO programming is inheritance—that is, classes can implement a hierarchy in which all descendant classes of a base class include all of its characteristic attributes and class functions, and add additional attributes or class functions.

The Object Management Group's Common Object Request Broker Architecture (CORBA) is a distributed object computing architecture supporting interoperability between object-oriented applications across a network. CORBA applications are composed of objects (individual executable software components that combine functionality and data). Objects can invoke operations on other objects by sending local or remote invocation requests via a defined interface— effectively calling a method on a target object, and including an object reference as a parameter of the invocation request. An Object Request Broker (ORB) associated with the originator of the request examines an object reference within the invocation request to discover where the target object is and, for remote target objects, routes the invocation request over the network to the remote object's ORB. Thus, the ORBs provide a mechanism for transparently communicating client requests to target objects. Requesting clients know the type of object they are invoking and so they know which operations can be invoked, what the inputs are and where they should go in the invocation. As described by Douglas Schmidt and Steve Vinoski in "An Introduction to CORBA Messaging", SIGS C++ Report, Vol. 10, No 10, November/December, 1998, CORBA messaging currently supports both synchronous and asynchronous communications between objects.

Known inter-program communications in a distributed network, whether synchronous or asynchronous, may specify what operations are to be performed by a recipient or they may transmit data for a recipient to interpret, and it is known for communications to include complex data structures. However, typical inter-program communications do not include executable functions. This represents a failure to fully utilize the opportunities of OO programming.

IBM Corporation's MQSeries Everyplace product enables objects to be transmitted across a network. Both data and executable functions can be transmitted by embedding an object within a message which is transmitted in response to PutMessage command. The transmitted message is placed in a message queue, from where it is asynchronously retrieved by a receiver application program which issues a GetMessage request. This object transmission provides considerable advantages for efficient inter-program communications, while preserving the asynchronous semantics of a Put followed by a Get.

SUMMARY OF INVENTION

In a first aspect of the present invention, there is provided a method for communication in a distributed object-oriented data processing environment, comprising: sending from a first data processing apparatus to a second data processing apparatus a request for retrieval of an item from the second data processing apparatus, the request including a first object which is targeted at a data processing object of the second data processing apparatus, the first object including data and an executable class function for applying a test condition to data within the target data processing object; responsive to receipt of the first object at the second data processing apparatus, executing the class function to apply the test condition; responsive to a positive result from the test, generating a positive reply to the item request and sending the positive reply from the second data processing apparatus to the first data processing apparatus.

The invention employs communication via objects which are preferably transmitted between a sender computer program and a target data processing object in an object-oriented (OO) data processing environment. Hereafter, the transmitted objects will be referred to as transmission objects. The transmission objects encapsulate executable class functions as well as data parameters of the operations implemented by the class functions. The data processing object may be an OO application program or any other OO resource, and the sender program is also preferably an OO program. The sender computer program sends a first transmission object targeted at the data processing object, which may then generate a reply or trigger other operations such as additional communications. Preferably, data items which are required to be included in the transmission object can be inserted as object parameters or embedded objects. A retrieval request can include embedded objects such that the request achieves both data transmission and initiates a data retrieval.

The transmission of a request including embedded objects can be used to provide a number of advantages. Firstly, the inventors of the present invention have recognized that it enables flexibility in terms of how a transmitted request and the target data processing object interact. For example, the embedded objects within a request can include methods which are invoked in response to an event when the request is received by the target data processing object, and embedding functionality within the request itself may greatly reduce the required complexity of the target object. Also data within the embedded object may be used to implicitly trigger operations at the target data processing object without requiring the request to include explicit invocation commands for all operations.

In a preferred embodiment of the invention, a request for retrieval of a data item (which may be any multimedia item, or other orderable product or service) comprises a transmission object targeted at a remote data processing object. The transmission object encapsulates data and executable class functions for performing operations when the request is received by the target data processing object. The data comprises named, type-specified data values, such that it can be self-identifying and can be used to implicitly invoke required operations at the target and deliver required parameters. The transmission object embodying a request can also include a programmatic filter for performing a test when the transmission object is received, and for triggering operations depending on the outcome of the request. In particular, this may be used to implement conditional data retrieval or product/service ordering—i.e. returning a data item or multimedia object to a requester if a transmission object sent by the requester includes a test condition which is satisfied, or returning a confirmation that a product or service will be delivered.

The method may include the steps, responsive to a positive result of the test, of generating a second object implementing a verification request and sending the second object to a remote data processing apparatus to perform the requested verification check. The remote data processing apparatus sends a result of the verification check to the second data processing apparatus and the positive reply to the item request is generated in response to a positive verification result. The positive reply is then sent from the second data processing apparatus to the first data processing apparatus.

Conventional messaging solutions do not support the embedding of arbitrary data items within a parameter block of a request, since a conventional parameter block does not have the flexibility of the preferred embodiment of the present invention. Typical messaging solutions also do not support the transmission of objects which include executable class functions.

Typical conventional messaging systems make a clear distinction between the message data (message 'payload') and control information of a message which is held in a structured message header. In such systems, the message data is transmitted with associated control information which is used for routing and perhaps filtering and prioritizing messages. The message delivery mechanisms use this control information but only a target application program processes the message data. The inventors of the present invention have recognized that this distinction between the data content and the control information in a header, and the exclusive concentration on application-to-application communications, are unnecessary limitations in an OO environment. Objects which implement the message delivery architecture can be the target destination of a transmission object, and can process data items within a transmission object and/or trigger execution of functions within the transmission object.

A further distinction between the preferred embodiment of the present invention and many currently available messaging solutions is that the present invention enables certain communication flows to take place without every send operation requiring a second operation of retrieving the message from a target queue. As described above, preferred embodiments of the invention do not require all transmission objects to be sent and received between application programs, since the target data processing object can be any OO resource such as a message queue for example. In conventional message-queuing implementations, queues are typically only used as staging points in communications between applications, but that is not a limitation of the present invention in which the intended destination of a transmission object may be a queue. Furthermore, since requests as well as messages can be sent across a network with embedded parameters and objects for triggering operations, a single command flow can cause a transmission object to be sent to a target data processing object and can trigger a reply or some other response.

According to a second aspect, the invention provides a method of communication by transmission of objects within an object-oriented data processing environment, the transmitted objects including executable class functions and data, the method comprising: sending a first object from a first data processing apparatus to a second data processing apparatus via a communication link, the first object being targeted at a target data processing object and including an executable class function for applying a test condition to data within the target data processing object; responsive to receipt of the first object at the second data processing apparatus, executing the class function to apply the test condition and, according to the results of the comparison, generating and sending a reply to the first data processing apparatus.

In a further aspect of the invention, there is provided a method for communication in a distributed object-oriented data processing environment, comprising: sending from a first data processing apparatus to a second data processing apparatus a request for retrieval of an item from the second data processing apparatus, the request including a first object which includes an executable class function for performing an operation at the second data processing apparatus; and responsive to receipt of the first object at the second data processing apparatus, executing the class function to perform the operation, generating a reply to the request and sending said reply from the second data processing apparatus to the first data processing apparatus.

In a preferred embodiment, the present invention enables a request or transmission object to include a nesting of separate objects, with these separate objects being processed separately if required. Individual components within the request or transmission object can act as triggers for processing operations, and can each have control attributes associated with just that component. In one example, a request may be targeted at a first recipient and then an object which is a sub-component of the original request is extracted and sent onwards to another recipient to trigger further operations.

Preferably, a number of security attributes such as encryption, authentication and compression can be associated with each transmission object. In particular, different security attributes can be set for individual embedded objects such that a transmission object can have different security for its different sub-components. One application where this is useful is where the sender wants to enable the original target object to access some components of the transmission object but to only enable a specific trusted party to access other components. This can be highly advantageous in the modern networked world where individual users wish to purchase goods and services via on-line commercial transactions but without exposing their personal credit details. In conventional messaging solutions, a message's data payload may be encrypted but there is no provision for different security to be set for different parts of the data within a single message.

In a preferred embodiment of the invention, these attributes can themselves each be implemented as separate objects which include executable methods, such that an attribute object associated with a transmission object can apply the specified encryption, authentication or compression algorithm when the transmission object is encoded for transmission across the network, for example.

Data items within a transmission object according to the present invention are preferably implemented so as to include a name, a type and a value. The data processing object receives the transmission object and, by identifying the data type of individual data items within the transmission object, can respond to this data by initiating one or more operations. This use of type and name for data items makes the data items self-describing, which in turn supports the implicit invocation of operations at the target data processing object. Thus, both the transmission object and the target object can include programmatic filters or rules which determine what processing is required, avoiding the limitation of conventional systems to intra-application communications and enabling this implicit invocation of required operations. This determination may be based on the presence or absence of certain data fields or types within a transmission object, or on the results/ of a comparison between data values. This can provide very efficient messaging by reducing the number of bytes which must be transmitted compared with typical prior art solutions. Receipt of a transmission object including certain typed data items may trigger generation of a reply within a synchronous communication session or trigger some other processing.

In a preferred embodiment of the present invention, transmission objects implement methods for transforming themselves into a data format suitable for transmission across a network, and methods for restoring their structure on receipt. This is significant because of the complexities that otherwise arise when attempting to send objects across a network from one process to another—such as the problem that shipping objects across a network typically violates object encapsulation and data hiding because of the apparent requirement for external analysis of the object's data to encode the object for transmission, and to rebuild it on the receiving side. Recent CORBA developments include messaging between objects in a distributed network, but the messages themselves are method calls and not objects. Solutions such as the Distributed Computing Environment from OSF provide remote procedure call mechanisms which can transmit complex data structures but do not transmit objects across a network According to a preferred embodiment of the present invention, the transmission objects include class functions for transforming themselves into a binary byte array containing an encoded form of the contents of the object which can be read and parsed to restore the transmission object. The preferred embodiment of the invention uses an encoding scheme which minimizes the number of bytes which are required to be transmitted.

In a further aspect, there is provided an object-oriented communication manager for managing transmission of communications from a first data processing apparatus, and for managing receipt of communications at said first data processing apparatus, the communication manager comprising: program code for generating a request for retrieval of an item from a second data processing apparatus, including program code for instantiating a first object class to generate an object for inclusion within said request, the generated object comprising data and an executable class function for applying a test condition to data within a target data processing object; program code for transmitting the request including said generated object to the target data processing object; and program code for receiving a reply from the target data processing object.

The invention may be implemented by a computer program, available as a program product comprising program code recorded on a machine readable recording medium, for controlling the performance of operations in a data processing apparatus in which it runs. The data processing apparatus my be a lightweight device such as a PDA, laptop computer or mobile telephone, but could equally be a larger data processing system.

In one aspect, the invention provides a computer program for controlling the operation of a data processing apparatus on which it runs to manage communications to and from the data processing apparatus, the computer program comprising: program code for generating a request for retrieval of an item from a second data processing apparatus, including program code for instantiating a first object class to generate an object for inclusion within said request, the generated object comprising an executable class function for applying a test condition to data within a target data processing object; program code for transmitting the request including said generated object to the target data processing object; and program code for receiving a reply from the target data processing object.

In a further aspect, the invention provides a data processing apparatus including means for managing transmission of communications from said apparatus and for managing receipt of communications by said apparatus, the apparatus comprising: means for generating a request for retrieval of an item from a second data processing apparatus, including program code for instantiating a first object class to generate an object for inclusion within said request, the generated object comprising an executable class function for applying a test condition to data within a target data processing object; means for transmitting the request including the generated object to the target data processing object; and means for receiving a reply from the target data processing object.

In a further aspect, the invention provides a method for ordering goods or services using transmission of objects via a communication network, the transmitted objects including executable class functions and data, the method comprising: sending a request for goods or services from a first data processing apparatus to a target data processing object at a second data processing apparatus, the request comprising a first object including data and an executable class function which is responsive to receipt of the request at the second data processing apparatus to process data within the target data processing object to determine whether the request can be satisfied; and receiving a reply to said request which reply includes the result of said determination.

BRIEF DESCRIPTION OF DRAWINGS

A preferred embodiment of the invention will now be described in more detail, by way of example only, with reference to the accompanying drawings in which.

DETAILED DESCRIPTION OF PREFERRED EMBODIMENTS

The present invention is implementable in association with IBM Corporation's MQSeries Everyplace messaging product. This computer program product extends IBM's MQSeries family of messaging products to meet the requirements of lightweight devices such as laptops, PDAs and sensors, and supports mobility and the requirements that arise from the use of fragile mobile communication networks. It provides assured once-only delivery of messages in the mobile environment, and is described in more detail in IBM Corporation's orderable documents numbers GC34-5843-01 "MQSeries Everyplace for Multiplatforms Introduction, version1.1" and SC34-5845-01 "MQSeries Everyplace for Multiplatforms Programming Guide, version 1.1" which are incorporated herein by reference.

Figure 1:
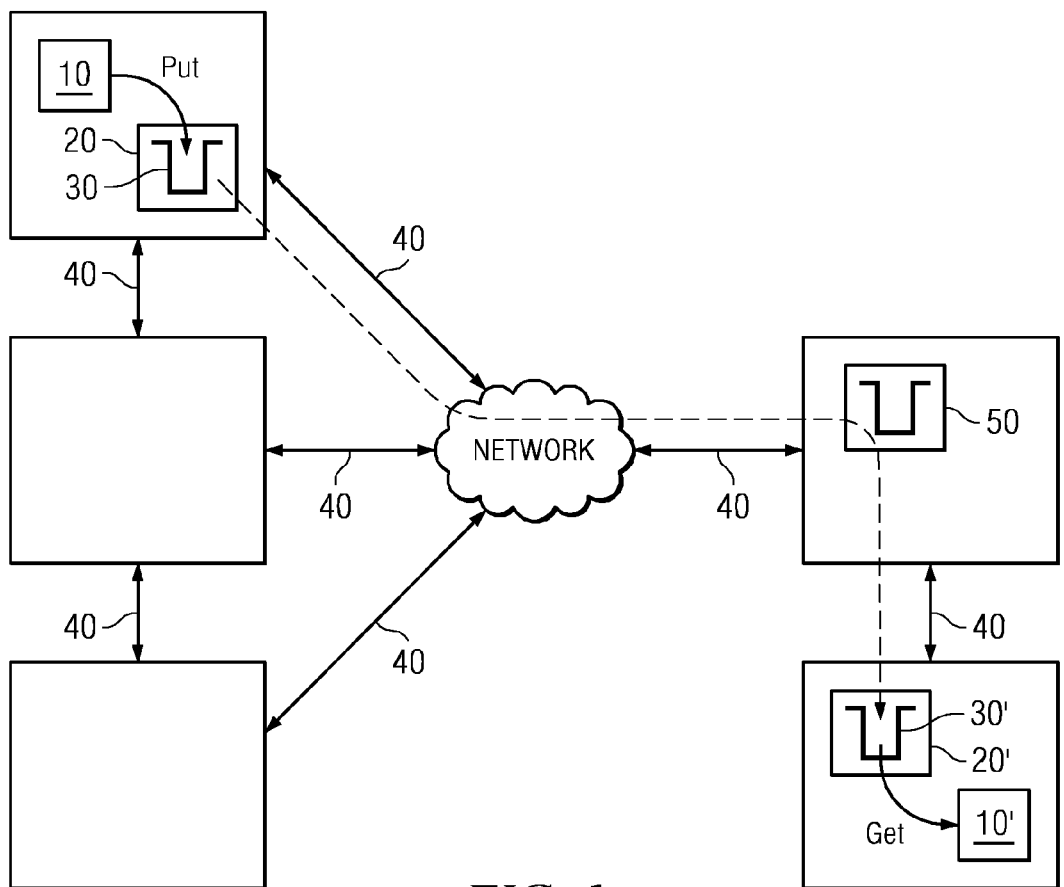
FIG. 1 is a schematic representation of messaging across a network, as is known in the art.

The messaging mechanisms of IBM's MQSeries products include communication managers (the message queue managers) which manage queues and the storing and transfer of messages between queues. As shown in FIG. 1, applications 10,10' communicate with each other using the facilities of a local queue manager 20, sending messages to queues 30 (by issuing a PutMessage command) and retrieving incoming messages from queues 30' (using a GetMessage command). If a message is put to a remote queue 30' (i.e. one owned by a remote queue manager 20') then it is transmitted over channels 40 to that remote queue manager. In this way, messages can be passed through intermediate queue managers 50 before reaching their destination. The operations of sending a message by one application and receiving a message by another application can be asynchronous, with the messages being queued en route when required.

Significant elements of the MQSeries Everyplace programming model are messages, queues and queue managers. The messages are objects that can contain application-defined content. They are typically held in a queue as a staging point during transmission between applications and they may be moved across a network of MQSeries Everyplace queue managers. Messages are addressed to a target queue by specifying the target queue manager and queue name pair.

Figure 2:
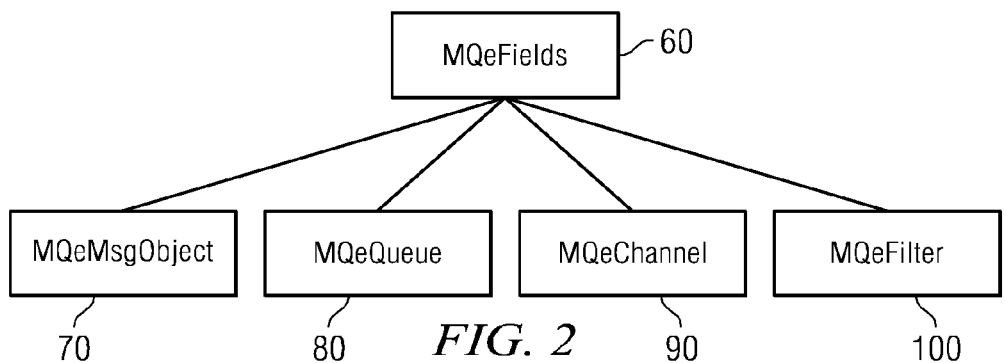
FIG. 2 is a representation of an object class hierarchy according to an embodiment of the invention.

As shown in FIG. 2, messages, queues and the communication channels between queue managers are all object instances of classes 70, 80, 90 which descend from an MQeFields class 60. Thus, according to the preferred embodiment of the invention, MQeFields objects provide the basic building blocks for many elements of the object oriented messaging solution of the present invention. Message objects are instances of an MQeMsgObject class 70. All message objects have a unique identifier which is generated by the MQSeries Everyplace queue manager. No other information is required to be present in a message object but, for typical messages, other fields will be present to carry the message data. This is typically achieved by using a descendent of the message object class.

MQeFields objects are an accumulation of fields for holding data items for sending and receiving or manipulating messages, with each field comprising a name, a data type and the data values. Each name is unique within the MQeFields object, is at least 1 character long (but kept short to minimize size for transmission) and conforms to the ASCII character set. The name is used to retrieve and update values. An MQeFields object is constructed as follows:

MQeFields Fields=new MQeFields( )

MQeFields objects can also have methods, for example for storing and retrieving items while maintaining the correct data type. Type-specific method invocations can be used to store and retrieve different integer types, floating point values, Boolean values, string values and arrays of values. For example, integer values may be placed in a fields object using:

Fields.PutInt("Int1", 1234)

And to retrieve an integer value from a fields object:

Int Int1=Fields.GetInt("Int1")

(or using PutByte( )/GetByte( ), PutLong( )/GetLong( ), Putshort( )/GetShort( ), etc)

Additionally, methods are provided to enable MQeFields objects to enumerate their fields and to verify that a field exists within an object. Similarly, MQeFields objects can be tested for equality. This will be described later with particular reference to MQeFilter objects. A fields object may be embedded within another fields object using PutFields( ) and GetFields( ) methods. There is no inherent limit to the number of items in a fields object or the number of fields objects an application has—the resources within the data processing apparatus is the limiting factor.

Significantly, MQeFields objects (and therefore message objects and, as described later, filter objects) have the capability of dumping and restoring their field items to and from a byte array. This allows the object to dump itself for transmission across a network, and to be restored on receipt. The contents of a fields object can be dumped into a binary form for transmission in response to a sender application's queue manager calling a Dump( ) method of the Fields object. This returns a binary byte array containing an encoded form of the contents of the object, as described in the next paragraph. The local queue manager of the target data processing object (whether a queue or some other resource) also understands the encoding scheme and invokes a Restore( ) method when it receives the encoded message or request, decoding the byte array to restore the fields object. Alternatively, the contents can be dumped into an encoded string (human readable) form using the DumpToString( ) method which requires the two parameters template and title. The template is a pattern string showing how the fields item data should be interpreted. For example:

"(#0)#1=#2\r\n"

where #0 is the data type (ascii, short, etc), #1 is the field name, #2 is the string representation of the value, and \r\n is merely an end of line string. Any other characters are copied as is to the output string.

According to the preferred embodiment, the methods for dumping and restoring field items respectively implement or interpret a specific encoding scheme which provides savings in the number of bytes transmitted. The encoded layout of data items benefits from a combination of: omitting leading zeros (0x00's and 0xFF's); reserving bits for use to specify a length code to enable sending of only the required length bytes; type-flagging of all data items to allow type checking on receipt; and use of a single byte for the three functions of delimiting another transmission object sub-component, defining the data type, and defining whether the data is null, positive or negative, or Boolean true or false. The data format comprises the following layout:

{Length Identifier Fence Data} where 'Length' is a variable number of bytes between 1 and 4; 'Identifier' is a variable length string of bytes and may be thought of as the name of a transmission object; 'Fence' is a special byte delimiting the boundary between the Identifier and optional 'Data' item and is used to contain the data type of the Data item. This encoding method is described in more detail in United Kingdom patent application GB-A-2349554 and U.S. Pat. No. 6,313,763, dated Nov. 6, 2001, which is incorporated herein by reference.

To implement comparison tests between Fields objects, MQeFilter objects can be created and initialized. As shown in FIG. 2, the MQeFilter class 100 is another class which inherits from the MQeFields class 60. The MQeFilter class provides methods for comparing the data within fields objects. Thus, MQeFilter objects are fields objects that can be matched for equality. This allows GetMessage requests to specify which messages are to be retrieved from a target queue by embedding a filter object within the request. That is, if the comparison results in a successful match, retrieve the message.

MQeFilter objects can include an item name, a test condition and a data item (for testing whether a named data item satisfies a specified test). MQeFilter objects may be embedded within a transmission object such that the comparison test is activated when the transmission object is received by its target object. An MQeFilter object which includes an item name, test condition and type-specified data item may be created as follows:

MQeFilter filter=new MQeFilter("Item",">=",(int) 12345)

(The type "int" may be replaced with one of: Boolean, byte, double, float, long, short, String of another MQeFilter).

A representative set of the test condition types that can be implemented are as follows:

Boolean tests (Boolean):
  == equal
  != not equal numeric tests (byte, double, float, int, long, short):
  == equal
  != not equal
  < less than
  > greater than
  <= less than or equal
  >= greater than or equal ASCII or Unicode tests (String):
  == equal
  != not equal
  =~ equal ignore case
  ? does contain
  !? does not contain
  =? starts with
  ?= ends with imbedded MQeFields tests:
  && and true (with other && and &! tests in the same fields object)
  &! and not true (with other && and &! tests in the same fields object)
  || or true (with other || and !! tests in the same fields object)
  !! or not true (with other || and !! tests in the same fields object)

An MQeFilter may also be created with a byte array (an encoded form of item name, test condition and data item) and this will restore a filter object from the supplied byte array. Thus, the data parameters of an MQeFilter object may be either the data to be used for a comparison or a byte array comprising a dumped filter object.

As well as enabling an application program to retrieve messages which match certain criteria, MQeFilter objects can also be embedded in GetRequests for another purpose—to provide an efficient mechanism for triggering operations at a remote system.

As mentioned previously, typical asynchronous messaging solutions require a pair of commands to handle message transfer—a PutMessage command which places a message on a queue is followed by a GetMessage request to retrieve the message—and the asynchronous message transfer is between sender and receiver application programs. The transmission of encoded, typed transmission objects according to the present invention can be adapted for use such that one of this pair of communication commands is not required. It can also be used outside the scope of application-to-application communication, and can be used either with or without security for individual components of the transmission object.

A GetMessage request can be targeted at either a local or a remote data processing object to initiate a sequence of communication flows and processing operations, without requiring an initial PutMessage command. A GetMessage request having an embedded filter object can be sent to trigger one or more operations according to the results of a comparison test, with one of the operations typically being generation of a reply message based on the comparison test. Additional fields objects can also be embedded in the request.

Thus, a single GetMessage request targeted at a remote data processing object may achieve the same result as a PutMessage and GetMessage command pair in conventional asynchronous messaging. The invention enables this to be implemented with flexibility in terms of the entity to which the GetMessage request may be targeted and with great flexibility in terms of the embedded objects that can be executed based on the results of the test.

Figure 3:
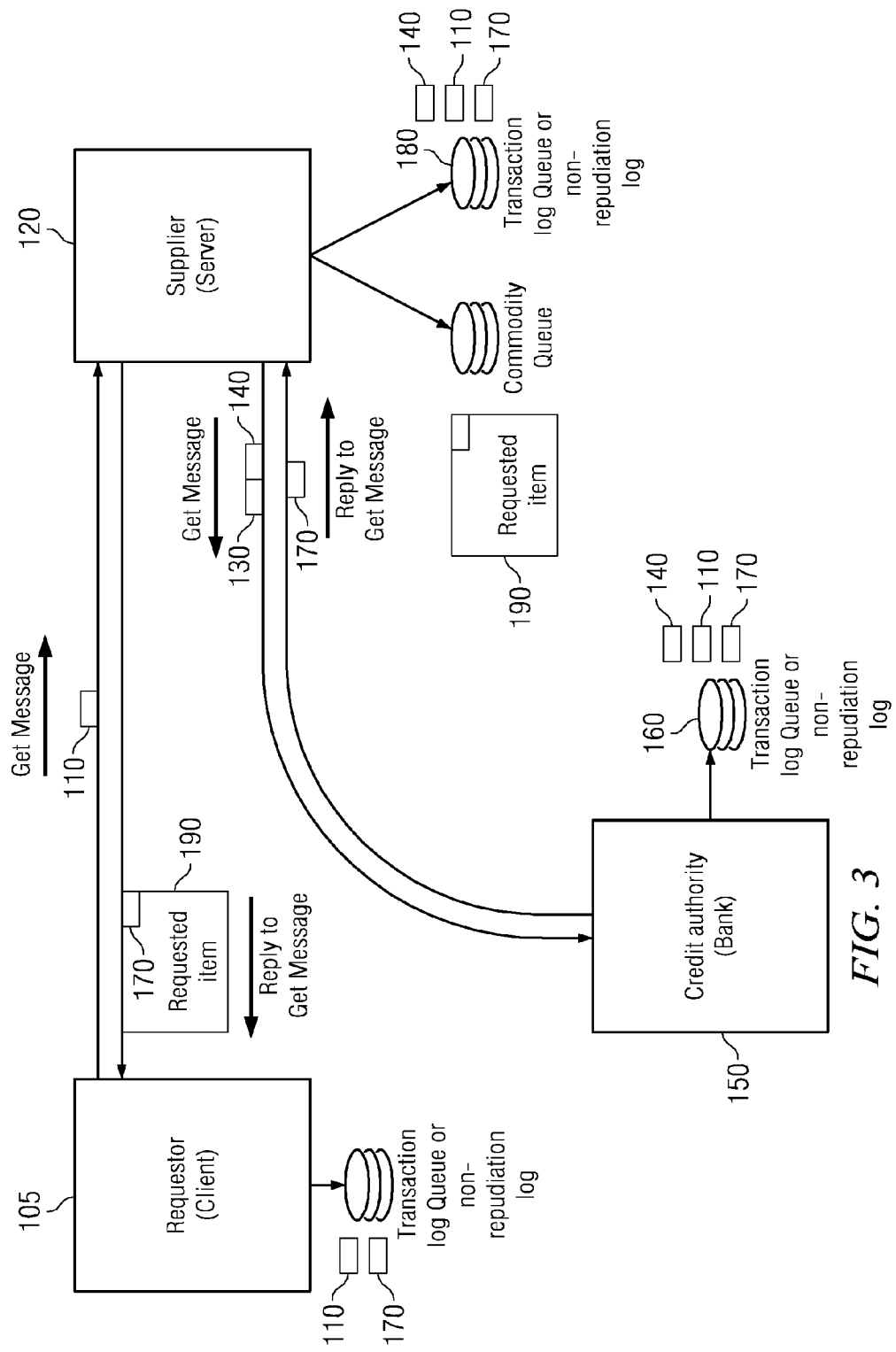
FIG. 3 is a schematic flow diagram showing a sequence of communication method steps according to an embodiment of the invention.

For example, consider the following scenario, which is described with reference to FIG. 3. A client wants to purchase some goods (for example, MP3 music files) from a vendor. The vendor wants to verify the payment with a bank.

The requestor/client issues a GetMessage request 110 requesting the MP3 music file. The message request also contains the requestor's credit details 130, and this may consist of digitally signed and/or encrypted credit card details embedded within the GetMessage request as an embedded field object. This embedding of objects within another object uses methods of the MQeFields class, as represented by:

WrapperObject.putFields("name", embedded object);

The capability to have separately encrypted sub-components within the GetMessage request will be described in more detail later. The GetMessage request contains an embedded MQeFilter object which specifies the required MP3 file, and so the GetMessage request includes an MQeFilter class function for applying the test condition to the data repository of the music store to determine whether the requested MP3 file is present in the music store.

The request, including the embedded filter object for testing for the presence of the music file, is dumped for transmission and forwarded to a queue within the music vendor's computer system 120. A queue manager on the vendor's system 120 invokes the Restore method, and then the restored filter object of the GetMessage request is used to determine whether the vendor is able to satisfy the request. This involves the MQeFilter object applying its test condition to its target object (typically a queue) to identify any items within the queue or referenced in the queue which match the test condition. If the queue holds references to items stored elsewhere, then identification of a match may invoke generation of a database retrieval request to obtain the requested item. This retrieval may be invoked as soon as a match is identified or only after a successful verification.

When a positive match is identified, the original credit details 130 are forwarded along with payment transfer details 140 to a credit authority such as a bank 150, again using the same technique of embedding the data within a GetMessage request. There are now two different encoded embedded field items 130, 140 within the GetMessage request forwarded to the bank. The Vendor may be unable to unwrap the credit card details, hence reducing the chances of card details misuse.

The bank 150 receives the second GetMessage request, unwraps and verifies the credit details and transfer request details. The bank then makes the appropriate transfer of funds, updates its log records 160 to provide an audit trail, and replies with the authorization details 170 as the reply to the GetMessage request.

The vendor logs the authorization 180 as part of it's non-repudiation process, either generates a reply message or retrieves one from its message store, and then replies to the requestor/client with a copy of the authorization 170 (for the client to keep for their non-repudiation log) along with the MP3 music file 190 just purchased.

The client receives the MP3 file along with the authorization details.

Hence the goods purchase transaction was completed using only GetMessage requests with embedded objects.

A second example application of the techniques described above is where a GetMessage includes a filter which is sent to a pipeline control valve, to evaluate whether the current flow rate is above or below a specified value and then potentially to control the valve according to the result of the evaluation (for example to implement a method of an embedded object which controls the valve to allow 10% additional flow).

In both of these examples, security is likely to be considered important. In the preferred embodiment of the present invention, security provision uses attribute objects. These may be associated with specific fields objects and contain the mechanisms to perform encryption, authentication and compression. Because they are associated with specified objects, and fields objects may be embedded within each other in a nested configuration, attribute objects allow selective securing and selective compression of content. This will described in more detail below.

An integrated set of security features is provided to enable the protection of message data both when held locally and when it is being transferred. These features provide protection in three different categories:

Local security—local protection of message (and other) data.

Queue-based security—protection of messages between initiating queue manager and target queue.

Message-level security—message level protection of messages between initiator and recipient.

Local- and message-level security are made available to applications. Queue-based security is an internal service of the queue managers. The security features of all three categories protect message data by application of an attribute object. Depending on the category, the attribute is either explicitly or implicitly applied. Local security facilitates the protection of message data locally (or protection of a fields object or descendant). This is achieved by creating an attribute with an appropriate symmetric cryptor and compressor, creating and setting up an appropriate key and explicitly inserting it in the attribute object and associating the attribute object with the message object. Queue-based security allows an application to leave message security considerations to the queue managers. Queues have authentication, encryption and compression characteristics and these are used to determine the level of security needed to protect message flows (as well as for persistent storage).

In particular, the association between an attribute object and a fields object is achieved by including an object reference to an attributes object within a fields object when it is created. The attribute object can have any one or all of an authenticator, cryptor, compressor. Then, when the fields object is dumped for transmission (and when restored) the specific encryption, compression or authentication algorithms of the attribute object are applied as part of applying the dump method. A different attribute object reference can be included in each embedded object when that is created, and different objects within the network may be given the decryption key for accessing different components of a nested object. Similarly, an embedded image may be compressed differently from an embedded audio component (e.g. Using MPEG compression for the image and audio compression for the audio component). An authenticator is used when it is necessary to verify the identity of a communication partner. This provides increased communication efficiency as well as the security benefits of selective securing of content.

It is well known that security is a major requirement for many electronic communications. Cryptographic techniques are widely used to prevent unauthorized interception of data transfers and corruption of their contents. However, many of the known communications solutions which implement security mechanisms on top of an established data transfer mechanism are not optimized for efficiency. The data transfer mechanisms and the security mechanisms have been developed independently and then combined, with little or no synergy between them. For example, typical messaging manager programs handle the task of transferring messages between application programs which may be located on different systems but the application program developer is often left to implement any required security features. Some known messaging manager programs are written with program exits that facilitate addition of security features, or Secure Sockets Layer (SSL) is implemented for specific communication links without providing full end-to-end protection. Thus, fully integrated end-to-end security is not the norm.

A messaging manager product according to a preferred embodiment of the present invention provides an integrated set of security features, as described above. These features enable protection of message data both when held locally and while it is being transferred. The latter includes queue-based security and mechanisms supporting message-level security between application programs. Queue-based security is implemented by a queue manager program without requiring specific actions by the initiator or recipient of the message and provides protection for messages between an initiating queue manager and a specified target queue, on the queue itself, and between the queue and a receiving queue manager. Message-level security protects messages between an initiator and a recipient, but does require action at the application level.

The above described security features protect message data by associating security attributes with messages and queues, each attribute including one of more of an authenticator, a cryptor and a compressor. Security is applied whenever the attributes associated with a message or queue are invoked, such as when the message is "dumped" for transmission.

A message (descendant of MQeFields class) can also contain a number of items which are themselves dumps of other MQeFields objects. Hence, by applying different attributes to these items it is possible to create a message with multiple protected items, each of which can only be decoded to an unprotected form by its intended recipient.

In conventional messaging solutions, such as those which rely on SSL, security tends to be implemented as an all-or-nothing encryption—there is only one level of encryption for all types of data. This approach is adequate for many applications, but other applications require the participation of a number of separate parties who may not all be trusted to decrypt all of the transmitted information. Typical messaging solutions have not provided a satisfactory solution for these applications.

As noted above, queues are used to hold message objects. They are identified by a name that is unique within a particular queue manager. If the data processing apparatus running the messaging software is configured to have local queues, then asynchronous (off-line) working is possible. In the absence of local queues, only synchronous communication with a remote apparatus is available. As instances of a class which descends from the MQeFields class, queues may have attributes such as authentication, compression, and encryption which are used when a message object is moved to ensure protection of its contents. Queues are also associated with a file descriptor that controls the storage mechanism for the queue, for example that it is to be mapped into the file system, or alternatively into memory.

Queue managers control how and where the various message objects are stored or sent. Queue managers are identified by a name that is globally unique. Queue managers can be configured to support queues (a full queue manager) or not (a stub queue manager). All queue managers support synchronous messaging operations, such as the ability to access queues to get, put and browse messages. A queue manager with local queues also supports asynchronous message delivery. Typically the stub queue manager option is used to reduce the footprint of the messaging software on small mobile devices.

Asynchronous and synchronous message deliveries have very different characteristics and consequences:

Asynchronous message delivery: the application passes the message to the message queue manager for delivery to a remote queue. An immediate return is made back to the application after the put operation. The message queue manager temporarily holds the message locally, until it can be delivered. Delivery may be staged, with the message queue manager responsible for delivery. This mode of operation provides once-only assured delivery. Once-only assured delivery means that the message queue manager will deliver a message once, and not more than once. If a message cannot be delivered (e.g. because the target queue does not exist) the message will not be discarded but will be kept and its non-delivery flagged. The message queue manager will not lose the message in the event of an application, system or network failure.

Synchronous message delivery: the application puts the message to a queue managed by the message queue manager. The queue manager synchronously contacts the target remote queue and places the message. After delivery, the queue manager returns to the application. Contact with the remote queue manager may involve the queue manager routing through intermediate data processing apparatus. The application is responsible for error handling.

Queue managers provide applications with Get, Put, Browse, Wait, Listen and Delete operations. The message Get operation will retrieve the first available message, removing it from the queue, unless a filter is specified to test for equality. If a filter is specified, any fields in the message can be used for selective retrieval—such that if there is either inequality or equality (depending on the test) then the contents of a field object are extracted and returned to the requester.

Messages can be deleted from a queue without being retrieved through specification of the unique ID. Queues may also be browsed for messages under the control of a filter—browsing retrieves all the message objects matching that filter, but leaves them on the queue. Browsing under lock is also supported—which has the additional feature of locking the matching messages on the queue. Messages may be locked individually or using a filter—with the locking operation returning a lock id. Locked messages can be got or deleted only if the lock is supplied. Applications can wait for a specified time for messages to arrive on a queue, optionally with a filter to identify those messages of interest. Alternatively applications can listen for message events, again optionally with a filter.

Administrative functions control access to the message queuing environment. Queue manager and queue-level functions are controlled by administration, as is certification.

Message-related functions are typically regarded as the responsibility of applications. Administration is provided through an administrative interface that handles the generation and receipt of admin messages and is designed such that local and remote administration is handled in an identical manner. Requests for administration are sent to an admin queue of the target queue manager; and replies may be generated. The admin queue itself is unusual in that it does not have a persistent store—all messages are processed on arrival. Only one such admin queue exists per queue manager and access is subject to any authenticator that may have been associated with the queue. Once an admin message has been received, a reply message is optionally created from it in which the results can be stored, the administrative action is performed, and then the results may be sent back to the originator. The security attributes of the administration queue are used to control access to administrative function, the level of cryptor chosen defining the level of confidentiality required.

The invention claimed is:

1. An object-oriented data processing environment that includes a first data processing apparatus and a second data processing apparatus for managing communications between the first data processing apparatus and the second data processing apparatus, the object-oriented data processing environment comprising:

means for creating a request to send from the first data processing apparatus to the second data processing apparatus to retrieve an item from a second data processing apparatus and send the item to the first data processing apparatus, including program code for instantiating a first object class to generate a first object for inclusion within said request, the generated first object comprising an executable class function for applying a test condition to target data that is stored in a target data processing object that is included in the second data processing apparatus;

means, responsive to receipt of the generated first object at the second data processing apparatus, for executing the class function to apply the test condition to test the target data;

the second data processing apparatus including means for testing the target data to determine whether or not the item can be retrieved from the second processing apparatus;

the second data processing apparatus including means for generating a positive reply to the item request in response to a positive result from the test, and means for sending the positive reply to the first data processing apparatus;

wherein the first object instantiates a class which includes a class function for encoding the first object for transmission from the first data processing apparatus to the second data processing apparatus, and a class function for restoring itself when received at the second data processing apparatus;

wherein, responsive to attributes having been set for the first object, said encoding of the first object is performed in accordance with said attributes; and wherein a first sender computer program at the first data processing apparatus is responsible for sending the first object, the first sender computer program being responsive to said set attributes to create an attributes object and to associate the attributes object with the first object.

* * * * *